No. 894,474. PATENTED JULY 28, 1908.
A. C. TOMS.
GOVERNOR FOR TURBINES.
APPLICATION FILED JAN. 24, 1908.
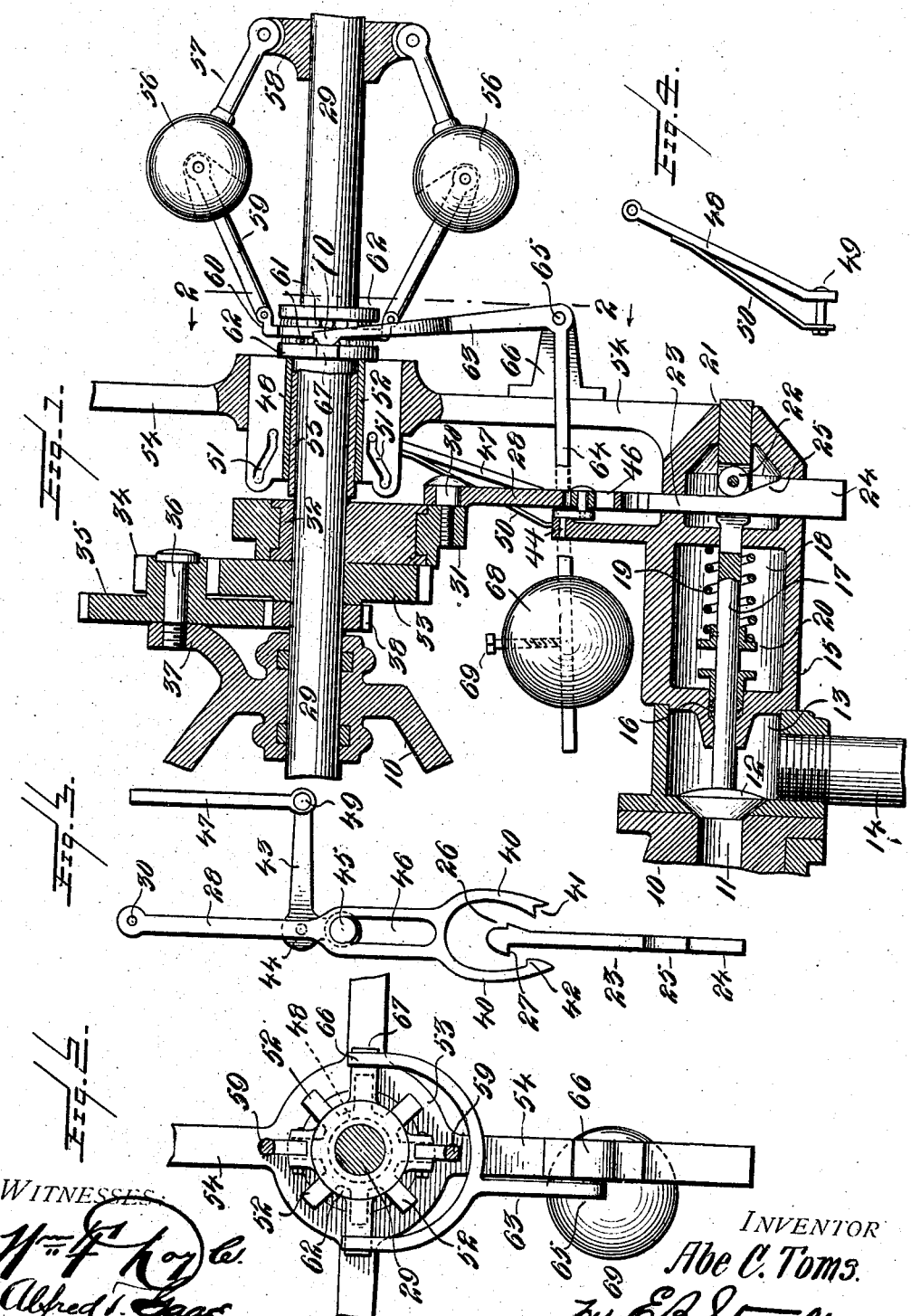
WITNESSES
INVENTOR
Abe C. Toms.
Attorney

UNITED STATES PATENT OFFICE.

ABE C. TOMS, OF SPOKANE, WASHINGTON.

GOVERNOR FOR TURBINES.

No. 894,474.　　　Specification of Letters Patent.　　　Patented July 28, 1908.

Application filed January 24, 1908. Serial No. 412,451.

*To all whom it may concern:*

Be it known that I, ABE C. TOMS, citizen of the United States, residing at Spokane, county of Spokane, and State of Washington, have invented certain new and useful Improvements in Governors for Turbines, of which the following is a specification, reference being had therein to the accompanying drawing.

This invention relates to a governor for turbine engines, and particularly to a construction by which the inlet valve may be intermittently shifted.

The invention has for an object to provide a novel and improved construction of inlet valve for a turbine or other engine in connection with a shifting bar by which the valve may be held in adjusted position.

A further object of the invention is to provide a novel and improved construction and arrangement of catcher arm controlled from a centrifugal governor carried upon the shaft of the engine whereby the valve bar is moved or shifted in either direction upon a variation of the speed of the engine beyond normal predetermined speed.

Other and further objects and advantages of the invention will be hereinafter set forth and the novel features thereof defined by the appended claims.

In the drawing:—Figure 1 is a vertical longitudinal section of the invention with parts in elevation; Fig. 2 is a detail section on line 2—2, Fig. 1; Fig. 3 is a detail elevation of the catcher arm and bar; and Fig. 4 is a similar view of the connecting rod from the governor.

Like numerals refer to like parts in the several views of the drawing.

The numeral 10 designates the frame or casing of the engine to which the invention may be applied. This casing is provided with a series of the inlet ports 11 adapted to be closed by the reciprocating valve 12 disposed in the chamber 13 to which elastic fluid is fed by the pipe 14. Mounted at one end of the chamber 13 to close the same is a casing 15 provided with a guide and packing box 16 for the valve stem 17, this stem being extended through the chamber 18 in which the coiled spring 19 is disposed with one end against the end of the chamber and the opposite end contacting with a stop 20 upon the valve stem. This valve stem is extended at its upper end through a bearing 21 in the valve casing and provided with a friction wheel 22 mounted to ride upon the shifting bar 23 which is formed at one end with an enlarged portion 24 and inclined face 25 in contact with which the wheel 22 travels. The opposite end of the bar 23 is provided with shoulders or faces 26 and 27 disposed in opposite directions to coöperate with the shifting mechanism to be hereinafter described.

A desirable form of this mechanism is herein shown and comprises the catcher arm 28 adapted to be operated from the shaft 29 of the engine. This arm is pivoted at its inner end 30 upon an eccentric strap 31 mounted upon an eccentric 32 carried by a gear 33 loosely mounted on the shaft 29. This gear meshes with the pinion 34 carried by the gear 35 which is mounted upon a stud post 36 carried by the bracket 37 from the engine casing. The gear 35 in turn meshes with the pinion 38 which is secured to the shaft 29 to rotate therewith. This construction causes a constant reciprocatory motion of the catcher arm 28 which when in position for normal speed of the engine, as shown in Fig. 3, does not contact with the shoulders of the shifting bar. For the purpose of oscillating this catcher arm to bring the bifurcated end portions 40 thereof toward or from the valve bar a governor connection of desirable form is herein shown. One of the portions 40 is provided with a shoulder 41 to engage the shoulder 26 of the bar when shifted into the path thereof and the opposite portion 40 has the shoulder 42 adapted to similarly engage the shoulder 27 of the bar. This shifting is effected through the bell crank lever 43 pivotally mounted at 44 and having a pin 45 extended upward into the elongated slot 46 of the catcher arm so as to permit the reciprocation of this arm during its oscillatory movement. From the bell crank lever 43 a connecting rod 47 extends to the shifting collar 48 mounted on the shaft 29. This rod 47 is pivoted at its end 49 on the crank arm and provided with the brace 50 extended beneath said arm, as shown in Fig. 4. The opposite end of the rod is connected in the slot 51 of the plate 52 upon the shifting collar 48 by a projection from the rod 47 to move said rod longitudinally as the collar is shifted by the governor. This collar is provided with a series of the radial plates 52 corresponding to the number of inlet valves used and these plates travel in slots or ways formed in the hub portion 53 of the support 54 supported from the valve casing, as shown in Figs. 1 and 2. In order to prevent the rotary movement of the shaft being transmitted to the collar 48 a sleeve 55 is interposed. This collar 48 may be shifted upon the shaft by any form of governor, for instance, the ball governor, as shown at 56 which has its links 57 at one end secured to the shaft 29 by the means of the bearing 58 thereon, and the links 59 at the opposite end connected with the annular plate 60, said plate being provided at opposite sides with ball bearings 61 disposed between each of the flanges 62 carried by the collar 48. This permits a free rotation of the governor with the shaft without transmitting such motion to the collar and parts connected therewith.

For the purpose of adjusting the tension of this governor and consequently the speed of the engine controlled thereby a bell crank lever having arms 63 and 64 is pivotally mounted at 65 upon the bracket 66 carried by one of the supports 54, and the free end 70 of the arm 63 bears against the radially disposed lugs 67 at opposite sides of one of the flanges 62 of the collar 48. Upon the free end of the lever arm 64 a weight 68 is adjustably mounted by means of the set screw 69 therein.

In the operation of the invention it will be seen that the inlet valve normally stands at the position to which it has been adjusted by the wedge bar contacting with the stem thereof, and the catcher arm reciprocates toward and from the bar without engaging it. As soon as the speed of the engine varies from normal this arm is shifted toward the bar through the governor connection therewith and moves the bar to throw open the valve more fully or close it, as the tension and degree of oscillation of the arm may determine. This arm through its connections is so geared as to have a much slower rotation than that of the shaft and may therefore engage the bar for only a portion of its longitudinal travel to partially open or close the valve. The governor collar for shifting the arm is mounted to secure a movement thereof longitudinally of the shaft and prevent any rotary movement, and the number of slotted plates carried by the shifting mechanism may also be varied proportionately to the valves to be governed thereby. The tension device for the governor produces an accurate adjustment not affected by temperature or strain, and the speed of the engine may be increased or decreased by an adjustment of the ball upon the arm of the crank lever as this weight affects the centrifugal force of the governor balls. It will therefore be seen that the invention presents a simple, efficient and economically constructed governor particularly adapted for turbine engines, although capable of application to other uses.

Having described my invention and set forth its merits, what I claim and desire to secure by Letters Patent is:—

1. In a governing mechanism, a valve, a shifting bar therefor, a driven catcher arm, a driving shaft provided with an eccentric thereon, an eccentric sleeve pivoted to said arm, and governor controlled means for oscillating said arm relative to said bar.

2. In a governing mechanism, a reciprocating valve provided with a stem, an actuating bar having an inclined face to engage said stem and provided at one end with shoulders disposed upon the opposite sides thereof, a slotted catcher arm having a bifurcated end engaging said bar and provided with oppositely disposed engaging portions to contact with said shoulders, and means disposed in the slot of said arm for laterally shifting said arm during the reciprocation thereof.

3. In a governing mechanism, a valve, a reciprocating bar for shifting the same having oppositely disposed shoulders, a reciprocating catcher arm disposed to embrace one end of said bar and having a plurality of engaging portions, and means for oscillating said arm into contact with said bar.

4. In a governing mechanism, a valve, a reciprocating bar for shifting the same having oppositely disposed shoulders, a reciprocating catcher arm disposed to embrace one end of said bar and having a plurality of engaging portions, a governor disposed upon a driven member, a sliding collar controlled thereby, and a connection from said collar to said arm for oscillating the same laterally of said bar.

5. In a governing mechanism, a valve, a shifting member therefor, an eccentric actuated from a driven member, a sleeve disposed upon said eccentric and upon which an arm is pivoted, a bifurcated free end upon said arm adapted to engage the valve shifter, and means for oscillating said arm.

6. In a governing mechanism, a valve, a shifting member therefor, an eccentric actuated from a driven member, a sleeve disposed upon said eccentric and upon which an arm is pivoted, a bifurcated free end upon said arm adapted to engage the valve shifter, a bell crank lever having a pin disposed in a longitudinal slot in said arm, a governor controlled member, and a connection from said bell crank lever to said member.

7. In a governing mechanism, a valve, a valve bar and oscillating catcher for shifting the same, a driven shaft, a pinion secured thereto, a countershaft provided with a gear and pinion thereon, a loosely mounted gear provided with an eccentric and meshing with the last mentioned pinion, and a strap mounted upon said eccentric and pivotally connected to reciprocate said catcher.

8. In a governing mechanism, a valve, a reciprocating shifting bar therefor, a pivoted catcher arm adapted to engage said bar, a governor member disposed upon a driven member, a sliding collar connected to said governor member and provided with a slotted plate, a rod extended from said plate, and means connected with said rod for oscillating said catcher arm toward and from the bar.

9. In a governing mechanism, a valve, a reciprocating shifting bar therefor, a pivoted catcher arm adapted to engage said bar, a governor member disposed upon a driven member, a sliding collar connected to said governor member and provided with a slotted plate, a rod extended from said plate, and a bell crank lever connected to said rod and having a pin disposed in a longitudinal slot in said arm to permit both an oscillatory and a reciprocatory motion thereof.

10. In a governing mechanism, a valve, a reciprocating shifting bar therefor, a pivoted catcher arm adapted to engage said bar, a governor member disposed upon a driven member, a sliding collar connected to said governor member and provided with a slotted plate, a rod extended from said plate, a bell crank lever connected to said rod and having a pin disposed in a longitudinal slot in said arm to permit both an oscillatory and a reciprocatory motion thereof, a bell crank tension lever having one arm disposed to bear upon said collar, and an adjustable weight carried by the other arm thereof.

11. In a governing mechanism, a driven shaft, a governor disposed thereon, a sliding collar provided with a radially disposed plate and connected with one end of said governor, a valve, shifting means therefor, and a connection from said plates to control said shifting means.

12. In a governing mechanism, a valve, a reciprocating shifting bar therefor provided with oppositely disposed shoulders, a catcher arm having opposite engaging portions to engage the shoulders of said bar, means for imparting to said arm a reciprocatory movement, and a governor connection for moving said arm laterally of said bar.

In testimony whereof I affix my signature in presence of two witnesses.

ABE C. TOMS.

Witnesses:
W. J. C. WAKEFIELD,
E. STANDLEY.